UNITED STATES PATENT OFFICE.

ARTHUR L. DAVIS, OF LIBERTY, MISSOURI, AND KENNETH D. JACOB, OF HELENA, ARKANSAS, ASSIGNORS TO THE UNITED STATES OF AMERICA.

METHOD OF MAKING A CATALYST.

1,386,555.  Specification of Letters Patent.  Patented Aug. 2, 1921.

No Drawing.  Application filed January 3, 1920. Serial No. 349,280½.

*To all whom it may concern:*

Be it known that we, ARTHUR L. DAVIS and KENNETH D. JACOB, citizens of the United States, and residents of Liberty, Clay county, State of Missouri, and Helena, Phillips county, State of Arkansas, respectively, have invented an Improvement in Method of Making a Catalyst, of which the following is a specification.

This invention relates to catalysts which are especially adapted, among other uses, to the synthetic manufacture of ammonia and has for its objects the economical production of durable, readily regenerable catalyst, which is capable of producing excellent yields of ammonia through the synthesis of its elements therewith.

Heretofore in the preparation of molybdenum-iron catalysts for use in the synthesis of ammonia, it has been customary either to evaporate to dryness a mixture consisting of predetermined proportions of solutions of ferric nitrate and ammonium molybdate, after which the residue was ignited and reduced in either hydrogen, ammonia, or nitrogen-hydrogen mixtures, or else on the other hand predetermined amounts of ammonium molybdate solution were added to a ferric nitrate solution of known content, the solution being maintained approximately at room temperature, and the ferric molybdate which was precipitated was filtered off, washed, dried, ignited and reduced as above.

When following the first method above indicated, it has been found that the necessary evaporation and ignition resulted in retarding the reduction of the product at the relatively low temperatures—such as employed in our process as hereinafter described, with the consequence that rather low yields of ammonia were obtained—and the large scale important employment of such processes was prevented. On the other hand, the employment of the second method above described results in the production of a final product of such varying composition, that it is difficult, if not practically impossible, to obtain a definite and predetermined iron and molybdenum content.

Our investigations have led to the discovery that it is possible to produce a catalyst of the so-called iron molybdenum type, which is homogeneous, of definite predetermined composition with respect to its iron and molybdenum content, rugged in form, resistant to ordinary contact poisons, easily regenerable, and which will produce excellent yields of ammonia.

In the manufacture of our improved catalyst, we preferably proceed as follows:

1085 parts of ferric nitrate are dissolved in 1500 parts of distilled water and heated to 50° C. To this solution is added slowly with stirring 300 parts of ammonium molybdate dissolved in a mixture of 500 parts ammonium hydroxid and 1000 parts distilled water. The slightly acidified mixture is heated to the boiling point and then filtered through a suitable filtering medium. The precipitate is thoroughly washed with distilled water as rapidly as possible, then dried and ignited. This resultant product is then ignited and reduced directly by hydrogen, ammonia or a nitrogen and hydrogen mixture.

The ignition is at from 500° C. to 800° C. and preferably the reduction is carried out between about 450° C. and 600° C. for from about 5 to 100 hours, the period being determined by the degree of reduction desired and the temperature employed. We have obtained equally good yields when the mixture was ignited at either 800° C. or 500° C., and the reduction carried out at either 600° C. or 450° C. respectively.

The synthesis of ammonia from its elements by the employment of the aforesaid catalyst is preferably carried out at increased pressure in accordance with well known methods. The catalyst may be formed in coarse particles, of homogeneous composition or may be distributed upon a carrier as lime, asbestos, magnesia, etc.

Having thus described our invention, what we claim and desire to secure by Letters Patent of the United States is:

1. The method of preparing a catalyst for chemical synthesis, including preparing a solution of ferric nitrate, slowly adding to this solution, while stirring, a solution of ammonium molybdate dissolved in ammonium hydroxid and distilled water, heating the resultant mixture to the boiling point, filtering, immediately washing the filtrate, drying the same, then igniting and reducing the resultant product.

2. The method of preparing a catalyst for chemical synthesis, including preparing a solution of ferric nitrate, slowly mixing therewith while stirring a solution of ammonium molybdate, heating the resultant mixture to the boiling point, filtering, washing the filtrate, drying the same, then igniting and reducing the resultant product.

3. The method of preparing a catalyst for chemical synthesis, including preparing a ferric nitrate, mixing therewith a solution of ammonium molybdate, heating the resultant solution to boiling point, filtering, washing and drying the filtrate, then igniting and reducing the resultant product.

4. The method of preparing a catalyst for chemical synthesis, including mixing solutions of ferric nitrate and ammonium molybdate, heating to the boiling point, filtering, washing and drying the filtrate, igniting and reducing the resultant product with a fluid free from catalytic poisons.

5. The method of preparing a catalyst for chemical synthesis, including mixing solutions of ferring nitrate and ammonium molybdate, heating to the boiling point, filtering, washing and drying the filtrate, igniting and reducing the resultant product with a medium including hydrogen.

ARTHUR L. DAVIS.
KENNETH D. JACOB.